United States Patent [19]

Watatani et al.

[11] 3,969,581

[45] July 13, 1976

[54] VERTICAL SYNCHRONIZING SIGNAL RECORDING APPARATUS

[75] Inventors: Yoshizumi Watatani, Machida; Michio Masuda, Tokyo, both of Japan

[73] Assignee: Hitachi, Ltd., Japan

[22] Filed: May 19, 1975

[21] Appl. No.: 578,765

[30] Foreign Application Priority Data

May 22, 1974 Japan............................ 49-57640

[52] U.S. Cl............................ 178/5.6; 178/DIG. 23; 178/69.5 TV; 360/37

[51] Int. Cl.²...................... H04N 7/00; H04L 7/00; H04N 5/78

[58] Field of Search...... 178/5.6, DIG. 23, 69.5 TV, 178/5.8 R, 69.5 R, 5.1, DIG. 35, 6.8; 358/12, 4; 360/8, 18, 37

[56] References Cited
UNITED STATES PATENTS

| | | | |
|---|---|---|---|
| 3,436,471 | 4/1969 | Mounts et al. | 178/5.6 |
| 3,472,951 | 10/1969 | Shimada et al. | 178/6.8 |
| 3,582,542 | 6/1971 | Smierciak | 178/69.5 |
| 3,798,358 | 3/1974 | Mayer et al. | 178/5.8 |
| 3,837,003 | 9/1974 | Justice | 358/4 |

Primary Examiner—Robert L. Griffin
Assistant Examiner—R. John Godfrey
Attorney, Agent, or Firm—Craig & Antonelli

[57] ABSTRACT

A recording apparatus extracting and recording for reproduction a video signal of a still-picture out of a received multiple signal, which video signal is divided for every several horizontal scanning lines and inserted in the vertical fly-back period of an ordinary television signal included in the multiple signal, comprises means for extracting and recording sequentially the video signal for a still-picture from out of the vertical fly-back period of the television signal, and means for extracting by detection of that vertical synchronizing signal of the television signal which is the nearest to a position where the vertical synchronizing signal of the video signal for a still-picture should be located, and for recording the extracted vertical synchronizing signal together with the extracted video signal for a still picture.

3 Claims, 5 Drawing Figures

VERTICAL SYNCHRONIZING SIGNAL RECORDING APPARATUS

BACKGROUND OF THE INVENTION

1. Field of the Invention

This invention relates to an apparatus for receiving a multiple signal transmitted by multiplexing an ordinary television signal and other video signals and for reproducing the video signals from the multiple signal, or more in particular to a recording apparatus in a still-picture reproduction system, whereby a still-picture video signal divided for every several horizontal scanning lines and inserted in the vertical fly-back period of an ordinary television signal included in a multiple signal received is extracted from the multiple signal and recorded for reproduction and, upon completion of the recording of the video signal in an amount sufficient to form a picture, the video signal is repeatedly read out for reproduction.

2. Description of the Prior Art

Recently, communication systems intended to meet a great variety of demands in the field of information service have been suggested. The still-picture multiplex transmission system is one. According to this system, a still-picture video signal is superposed on a currently used television broadcast signal in such a manner as not to interfere with the receiving of the other pictures by the current television receiver.

Such a still-picture multiplex transmission system will be briefly described below. In an example of the still-picture multiplex transmission system, a video signal carrying a still-picture and independent of an ordinary television signal is inserted at a proper position in the waveform of the ordinary television signal, for example, at a proper position in the vertical fly-back period not interferring with the operation of the conventional receiver. The 14th to 16th lines, and the 277th to 279th lines of the horizontal scanning period are one example of the position selected for insertion of the still-picture video signal. By so doing, it is possible to transmit three lines of video signal superposed for each field. (The resultant signal will be herein referred to as a still-picture multiplexed signal.) At the receiving end, the still-picture video signal inserted at a predetermined position of the television signal is extracted and written in such a memory or recorder as a magnetic disc recorder and, upon completion of the writing of the video signal representing a picture, the stored signal is read repeatedly thereby to reproduce the still-picture. The waveforms into which the still-picture video signal superposed on the ordinary television signal is divided for predetermined parts of the horizontal scanning period are identical with that of each line of the ordinary television signal. A control signal required for separating the video signal from the received still-picture multiplexed signal is inserted in the part of the still-picture video signal corresponding to the vertical fly-back period.

The indication on an indicating means such as used with the television receiver, of the still-picture video signal extracted from the still-picture multiplexed signal and stored in the recorder requires horizontal and vertical synchronizing signals. As such a horizontal synchronizing signal, the horizontal synchronizing signal of the ordinary television signal may be commonly used. The superposed video signal, however, should not carry the vertical synchronizing signal for its own. This is because, if the vertical synchronizing signal is added to the still-picture video signal, the fact that a vertical synchronizing signal different from the vertical synchronizing signal of the ordinary television signal is added thereto at a different position in the ordinary television signal adversely affects the vertical deflection circuit of the receiver receiving the ordinary television signal. And the receiver reproducing a still-picture must be additionally provided with a vertical synchronizing signal-generating circuit and a vertical synchronizing signal-adding circuit for adding another vertical synchronizing signal different from the original standard vertical synchronizing signal to the video signal stored in the memory, using the control signal as a reference. The vertical synchronizing signal-adding circuit, in which the DC level of the signal supplied from the vertical synchronizing signal-generating circuit is required to be rendered strictly identical with that of the video signal to which the vertical synchronizing signal is to be added, must be inconveniently adjusted.

SUMMARY OF THE INVENTION

Accordingly, it is an object of the invention to provide an apparatus having a simple construction capable of producing the vertical synchronizing signal for the still-picture video signal extracted from the still-picture multiplexed signal mentioned above.

Another object of the invention is to provide a receiver having a memory or recorder suitable for extracting a still-picture video signal from the received still-picture multiplexed signal and storing the still-picture video signal.

Still another object of the invention is to provide a memory or recorder suitable for extracting a video signal having no vertical synchronizing signal and superposed on an ordinary television signal in the vertical fly-back period thereof, and for adding a vertical synchronizing signal thereto and storing the extracted video signal.

In order to achieve the above-mentioned objects, the present invention provides an apparatus wherein a still-picture is reproduced from a received multiple television signal, having no vertical synchronizing signal, including an ordinary television signal and a still-picture video signal divided and inserted for every other or several horizontal scanning lines in the vertical fly-back period, the apparatus being characterized in that when the video signal inserted in the vertical fly-back period is extracted and stored, the position where the vertical synchronizing signal for the video signal is to be located is detected and that part of the ordinary vertical synchronizing signal of the television signal which is transmitted at that particular position is extracted and stored as the vertical synchronizing signal for the still-picture video signal.

DESCRIPTION OF THE PREFERRED EMBODIMENT

Prior to entering the description of the embodiment, signals suitable for being received by the receiver employing the apparatus according to the invention will be described with reference to the drawings.

Figure 1:
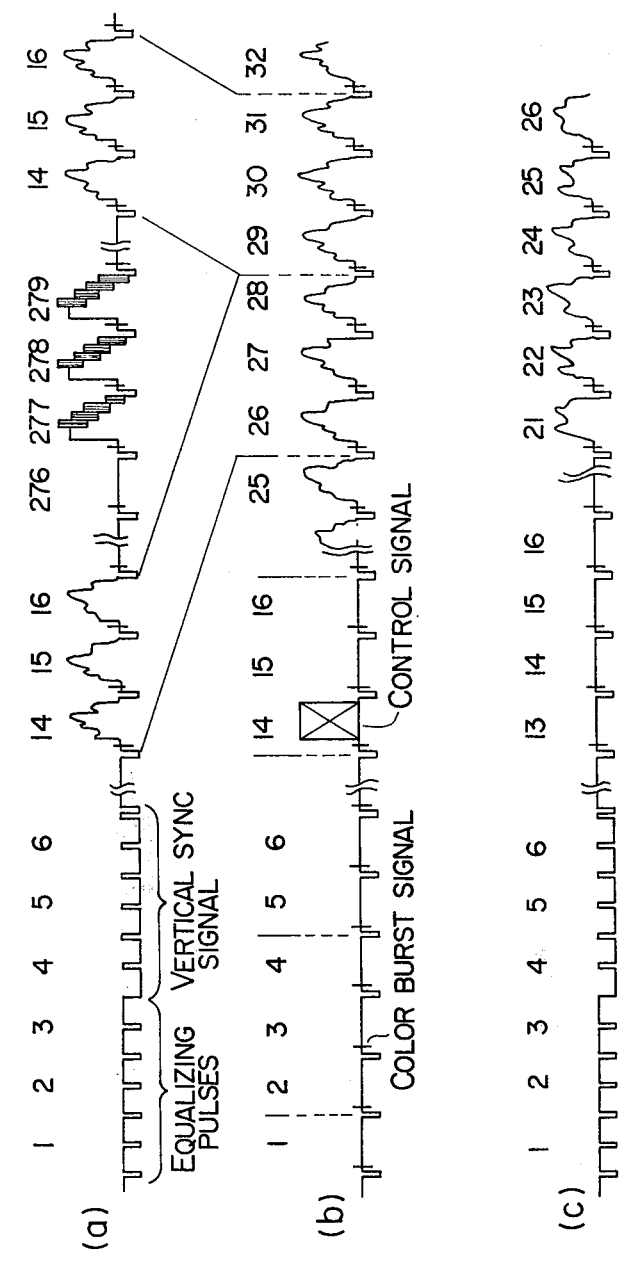
FIG. 1 is a diagram showing waveforms including (a) a waveform showing an example of a still-picture multiplexed signal, (b) a waveform of a still-picture signal, and (c) a waveform of an ordinary television signal.

The diagram of (a) of FIG. 1 shows a waveform of an example of the still-picture multiplexed signal including an ordinary television signal on which a still-picture is superposed by time division. The numbers attached over the waveform show different horizontal scanning periods. In the ordinary television signal, the vertical fly-back periods are from the first horizontal scanning period (the horizontal scanning period will hereinafter be referred to as the H period) to the 20th H period, and from the 264th to 284th H periods. During such periods, the ordinary television signal generally carries only those pulse signals associated with the synchronizing data including horizontal and vertical synchronizing signals and equalizing pulses. In the example shown in (a) of FIG. 1, however, still-picture signals are inserted in the 14th to 16th H periods and from the 277th to 279th H periods. In this case, the wave is so constructed that one program is transmitted during the period from the 14th to 16th H, and another program during the period from the 277th to 279th H. This is intended, as will be explained later, to maintain the phase consistence of the color subcarrier in receiving the still-picture multiplexed signal.

The diagram of (b) of FIG. 1 shows a waveform of a still-picture signal reproduced upon receipt of a multiplexed still-picture signal or a still-picture multiplexed signal transmitted. This still-picture signal is divided by 3H and inserted in the period from the 14th to 16th H and the period from the 277th to 279th H for each frame of the television signal.

The waveform of an ordinary television signal is shown in the diagram of (c) of FIG. 1 for reference.

Figure 2:
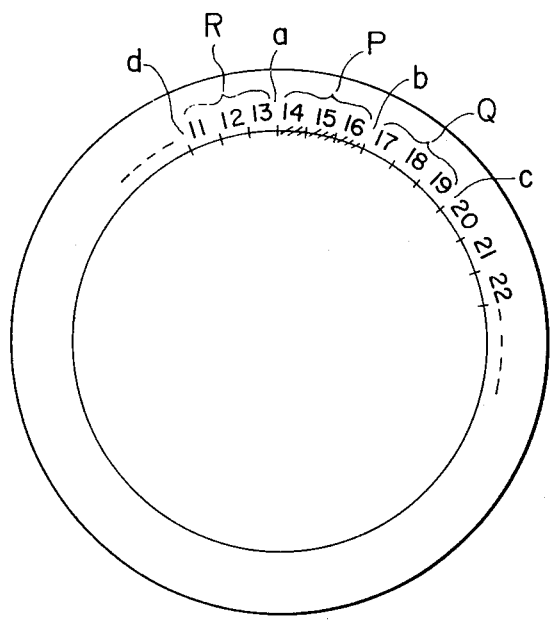
FIG. 2 is a plan view of a magnetic disc recorder for explaining the order in which the still-picture signal is stored.

The diagram of FIG. 2 shows the order in which the still-picture signal is recorded on a magnetic disc recorder used as a video recording apparatus of the receiver receiving the above-mentioned still-picture multiplexed signal. The magnetic disc recorder of FIG. 2 rotates at a sufficiently high speed to be able to record 261 scanning lines in every rotation. Generally, pictures carried by the ordinary television signal are displayed at the speed of 60 fields or 30 frames per second, one field and one frame containing 262.5 and 525 scanning lines respectively. As a result, the magnetic disc recorder shown in FIG. 2 is required to rotate more rapidly than in the repetitive scanning of the ordinary television signal by the period corresponding to 1.5 scanning lines per field or 3 scanning lines per frame. The 14th to 16th H periods are extracted from the still-picture multiplexed signal shown in (a) of FIG. 1, and the 14th to 16th periods of the still-picture signal as shown in (b) of FIG. 1 are recorded at the position P in FIG. 2 of the magnetic disc recorder rotating at the above-mentioned speed. Upon the arrival of the next signal covering the period from the 14th to 16th H of the next frame, that is to say, after tha lapse of time corresponding to 525 scanning lines (The time corresponding to one scanning line will hereinafter referred to as $T_H$, in such a manner as $525T_H$ in the present case.), the magnetic disc recorder will have reached the position $b$ of FIG. 2 covering a couple of $261T_H$ plus $3T_H$. Consequently, the part covering the period from the 17th to 19th H of the still-picture signal is recorded at the position Q of FIG. 2. In this way, signals covering 3 scanning lines per frame are recorded thereby to record such a video signal as to form one field with $261T_H$ on the magnetic disc recorder shown in FIG. 2. If one field of video signal is to be recorded during the period of $261T_H$ on the magnetic disc recorder shown in FIG. 2, 87 frames ($261T_H \div 3$) of ordinary television signals, namely, 2.9 seconds of time are required. The reason why the recording is effected not for every field but intermittently for every frame is that if the recording is effected for every field, the phase of the color subcarrier is reversed, thereby making it difficult to maintain the phase consistency at the receiving end, since the color subcarrier is transmitted while maintaining its compatibility with the ordinary television signal as shown in (a) of FIG. 1.

The aforementioned principle involving the signals covering the periods from the 14th to 16th H in odd-numbered fields similarly applies to those signals multiplexed during the periods from the 277th to 279th H in even-numbered fields.

In the still-picture signal shown in (b) of FIG. 1, a control signal is inserted in the 14th H period, which control signal comprises a pulse signal having a fixed pulse pattern called a mark pattern. This fixed pulse pattern, which uses a code pulse signal having a predetermined code so as to distinguish the same from other signals, comprises a number of bits for preventing the same code from occurring in other signals by coincidence, and is a technique widely used in data transmission.

Even though the example shown in (a) of FIG. 1 handles the horizontal scanning periods from the 14th to 16th H and from the 277th to 279th H for multiplexing the still-picture signal, other horizontal scanning periods included in the vertical fly-back periods may be used so far as they are compatible with the ordinary television signal or does not interfere with the operation of the receiver receiving the ordinary television signal.

Figure 3:
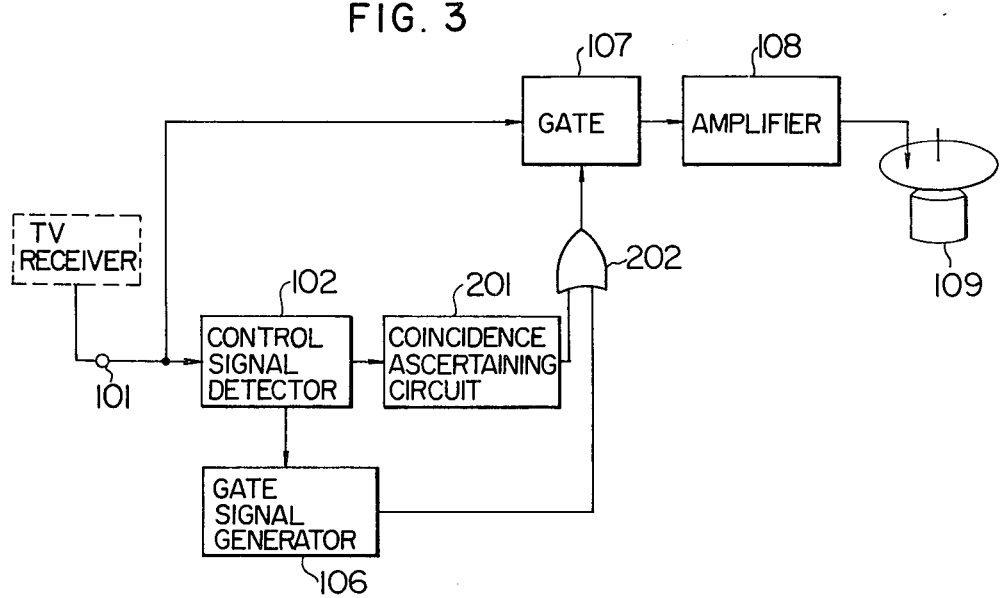
FIG. 3 is a block diagram showing an embodiment of the present invention.

Referring to the block diagram of FIG. 3 showing an embodiment of the invention, reference numeral 101 shows an input terminal to which the still-picture multiplexed signal as shown in (a) of FIG. 1 is applied. This signal is obtained in such a manner that a still-picture multiplex signal transmitted on an appropriate carrier wave is received and passed through a tuner, an intermediate frequency wave amplifier and a video signal detector as in an ordinary television receiver. The signal shown in (a) of FIG. 1 applied to the input terminal 101 is divided and separately applied to a gate circuit 107 and a control signal detector 102. The control signal detector 102 detects the mark pattern of the control signal inserted in the 14th H period of the abovementioned still-picture signal and then produces a pulse, which mark pattern, as mentioned already, comprises a fixed coded pulse train having a predetermined number of bits. This mark pattern is easily detected by the use of the technique handling digital signals. An example of such a detection technique uses a shift register having a capacity of the same number of bits as the bits making up the mark pattern, a reversing circuit for reversing the output of each stage of the shift register as required, and an AND circuit for producing a logic product of all the output signals at the stages of the shift registers irrespective of whether they are reversed or not.

The gate signal generator 106 produces a gate signal $3T_H$ wide for every frame of the ordinary television signal for extracting a still-picture signal, using the output signal from the control signal detector 102 as a reference.

The vertical synchronizing signal coincidence ascertaining circuit 201 produces, in response to the output signal from the control signal detector 102, a gate signal for passing the vertical synchronizing signal of the ordinary television signal at the time point when the vertical synchronizing signal for the still-picture signal coincides in position with the vertical synchronizing signal for the ordinary television signal. The output from the gate signal generator 106 and the output of the vertical synchronizing signal coincidence ascertaining circuit 201 are applied through an OR circuit 202 to a gate circuit 107. As a result, the still-picture signal and the vertical synchronizing signal are extracted from the still-picture multiplexed signal applied to the input terminal 101. The extracted signals are then applied to the recording amplifier 108 and recorded on the magnetic disc recorder 109.

In the case where the still-picture multiplexed signal shown above is involved, for example, the 1st H period, second H period, . . . , 16th H period of the ordinary television signal coincide with the 1st H period, 2nd H period, . . . , 16th H period of the still-picture signal respectively, when the still-picture signal of the 14th to 16th periods is transmitted, in view of the fact that the multiplexed signal is positioned in the period from the 14th to 16th H of the multiple signal as shown in (a) of FIG. 1. Therefore, it suffices if the vertical synchronizing signal of the ordinary television signal in the field in which the 14th to 16th H period of the still-picture signal is transmitted may be recorded as it is.

In the event that the transmitting position of the still-picture signal or the order in which it is transmitted is changed, the position of the vertical synchronizing signal of the ordinary television signal is likely to be differentiated from that of the vertical synchronizing signal of the still-picture signal. However, this poses no serious problem in terms of a reproduced picture and therefore the invention may be embodied substantially in the above-described form, if the displacement of the vertical synchronizing signal of the still-picture signal recorded is limited to the length no more than several times of the horizontal scanning period.

Figure 4:
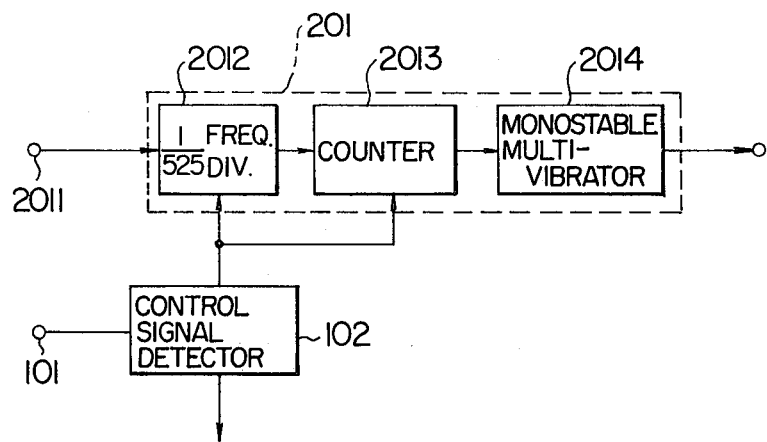
FIG. 4 is a block diagram showing an example of a vertical synchronizing signal coincidence ascertaining circuit used in an embodiment of the invention.

Next, a block diagram showing an example of the actual construction of the vertical synchronizing signal coincidence ascertaining circuit 201 is illustrated in FIG. 4.

Figure 5:
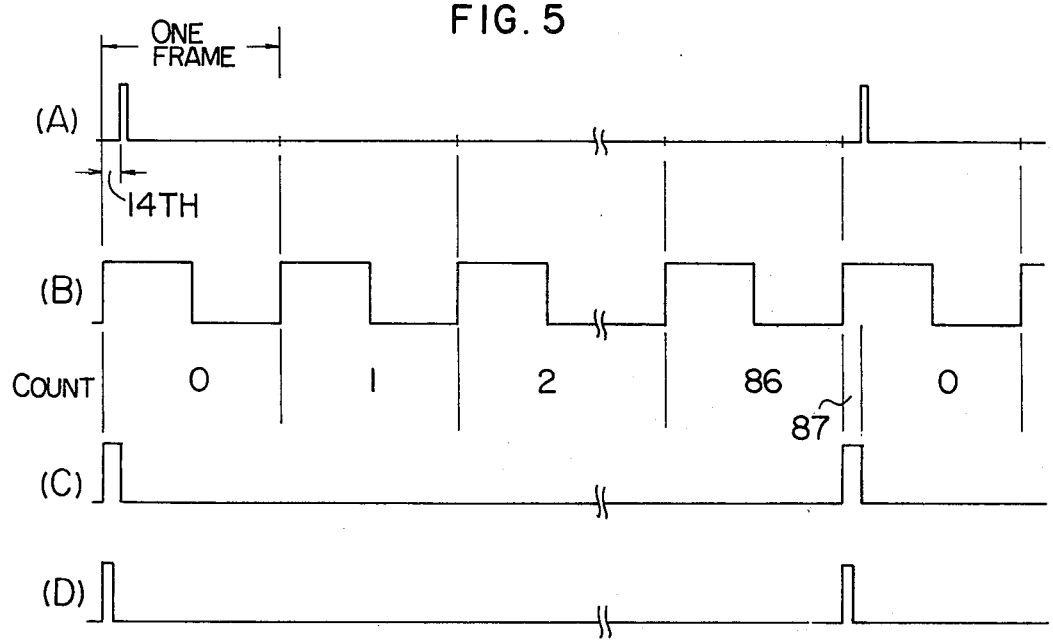
FIG. 5 including (A) to (D) thereof shows timing charts for explaining the operation of the circuit shown in FIG. 4.

In the drawing under consideration, reference numeral 2011 shows an input terminal to which the horizontal synchronizing signal reproduced in the receiver is applied, numeral 2012 a frequency divider circuit for dividing the frequency of the horizontal synchronizing signal into 1/525, numeral 2013 a counter for counting the output signals of the frequency divider circuit 2012, and numeral 2014 a monostable multivibrator. The diagram of FIG. 5 shows a timing chart of the output signals produced from the various sections of the vertical synchronizing signal coincidence ascertaining circuit 201 shown in FIG. 4. In the timing chart under consideration, the waveform (A) is an output signal from the control signal detector 102, the waveform (B) an output signal from the frequency divider circuit 2012, the waveform (C) an output signal from the counter 2013, and the waveform (D) an output signal from the monostable multivibrator 2014. First, the control signal detector 102 detects the control signal inserted in the 14th H period of the still-picture signal. At this time, it was already mentioned that the positions of the vertical synchronizing signal of the ordinary television signal and that of the still-picture signal coincide with each other, and an output as shown in (A) of FIG. 5 is produced from the control signal detector 102. The frequency divider circuit 2012 divides the horizontal synchronizing signal applied to the input terminal 2011 into 1/525 and produces a pulse signal having a period of one frame. The phase of the pulse signal produced from the frequency divider circuit 2012 is controlled by the output signal of the control signal detector 102, and the rise point of the pulse signal is so set as to coincide with the starting point of the frame of the ordinary television signal received. Under this condition, the output of the frequency divider circuit 2012 is as shown in (B) of FIG. 5. The counter 2013 counts the output signals shown in (B) of FIG. 5 produced from the frequency divider circuit 2012. The counter 2013 is reset, like the frequency divider circuit 2012, by the output signal from the control signal detector 102. As a result, the positions of the vertical synchronizing signal of the ordinary television signal and that of the still-picture signal coincide with each other when the output signal is produced from the control signal detector 102. Therefore, when the counter 2013 counts up to 87, the position of the vertical synchronizing signal of the ordinary television signal coincides with that of the vertical synchronizing signal of the still-picture signal again. As a result, by producing a gate signal for extracting the vertical synchronizing signal at that particular time, the vertical synchronizing signal of the still-picture signal is recorded in phase. The output signal of the counter 2013 counting 87 is as shown in (C) of FIG. 5. The monostable multivibrator 2014 is for setting the time width of the signal required for actual recording operation, and produces a pulse with the time width including the vertical synchronizing signal.

As mentioned above, the vertical synchronizing signal of the ordinary television signal is extracted and recorded on the magnetic disc recorder on which the still-picture multiplexed signal is also extracted and recorded, thus easily permitting the vertical synchronizing signal to be added to the still-picture signal. In other words, since the still-picture multiplexed signal transmitted is such that the DC level of the vertical synchronizing signal of the ordinary television signal completely coincides with that of the still-picture signal, no level adjustment is required in adding the vertical synchronizing signal to the still-picture signal.

In addition to the above-described method in which the vertical synchronizing signal is recorded after the detection of the position of the control signal, it is also possible to employ a method, according to the invention, in which all the vertical synchronizing signals are recorded before the position of the control signal is detected, so that any of the recorded signals is erased in the absence of a control signal in the periods from the 14th to 16th H or from the 277th to 279th H of the ordinary television signal immediately following the respective vertical synchronizing signals recorded, while a still-picture is started to be extracted only when a control signal is detected in such periods.

We claim:

1. In a recording apparatus receiving a time-division multiple signal comprising a first video signal, and a second video signal without any vertical synchronizing signal, said second video signal being divided for each horizontal scanning line and, in the predetermined number of the horizontal scanning lines, inserted in predetermined positions within the vertical fly-back period of said first video signal, said second video signal being extracted and recorded for the purpose of reproduction; the improvement comprising means for extracting from said multiple signal said second video signal inserted in said predetermined positions within the vertical fly-back period of said first video signal, means for recording said second video signal extracted by said extracting means, means for detecting the vertical synchronizing signal for said first video signal transmitted at substantially the position where a vertical synchronizing signal for said second video signal should be located, means for extracting said vertical synchronizing signal for said first video signal from said multiple signal when said position where said vertical synchronizing signal for said second video signal should be located is detected by said detecting means, and means for recording on the recording means for said second video signal the vertical synchronizing signal extracted by said extracting means.

2. In a recording apparatus receiving a time-division multiple signal comprising a first video signal, and a second video signal without any vertical synchronizing signal, said second video signal being divided for each horizontal scanning line and, in the predetermined number of the horizontal scanning lines for each frame, inserted in predetermined positions within the vertical fly-back period of said first video signal, said second video signal being extracted and recorded for the purpose of reproduction; the improvement comprising means for extracting from said multiple signal said second video signal inserted in said predetermined positions within the vertical fly-back period of said first video signal for each frame, means for recording said second video signal extracted by said extracting means, means for detecting the vertical synchronizing signal for said first video signal transmitted at substantially the position where a vertical synchronizing signal for said second video signal should be located, means for extracting said vertical synchronizing signal for said first video signal from said multiple signal when said position where said vertical synchronizing signal for said second video signal should be located is detected by said detecting means, and means for recording on the recording means said second video signal and the vertical synchronizing signal extracted by said extracting means.

3. In a recording apparatus receiving a time-division multiple signal comprising a first video signal, a control signal, and a second video signal without any vertical synchronizing signal, said second video signal being divided for each horizontal scanning line and, in the predetermined number of the horizontal scanning lines, inserted in predetermined cycles at predetermined positions within the vertical fly-back period of said first video signal, said control signal indicating the initiation of said second video signal and being inserted in the vertical fly-back period of said second video signal, said second video signal being extracted and recorded for the purpose of reproduction; the improvement comprising means for detecting said control signal and generating a trigger pulse, means for extracting said second video signal in predetermined cycles from within said vertical fly-back period of said first video signal by using said trigger pulse as a reference, means for recording said second video signal extracted from said extracting means, and means for extracting said vertical synchronizing signal for said first video signal and recording said vertical synchronizing signal on said recording means together with said second video signal, when said trigger pulse is generated.

* * * * *